(12) United States Patent
Eda et al.

(10) Patent No.: US 10,902,032 B2
(45) Date of Patent: *Jan. 26, 2021

(54) MINIMIZING DATA TRANSPORT WITHIN A STORLET ARCHITECTURE

(71) Applicant: International Business Machines Corporation, Armonk, NY (US)

(72) Inventors: Sasikanth Eda, Vijayawada (IN); Deepak R. Ghuge, Sangamner (IN); Kaustubh I. Katruwar, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/440,772

(22) Filed: Jun. 13, 2019

(65) Prior Publication Data

US 2019/0294618 A1 Sep. 26, 2019

Related U.S. Application Data

(63) Continuation of application No. 15/610,098, filed on May 31, 2017, now Pat. No. 10,402,429.

(51) Int. Cl.
| | | |
|---|---|---|
| *G06F 9/46* | (2006.01) | |
| *G06F 16/22* | (2019.01) | |
| *G06F 16/28* | (2019.01) | |
| *G06F 16/901* | (2019.01) | |

(52) U.S. Cl.
CPC .............. *G06F 16/285* (2019.01); *G06F 9/46* (2013.01); *G06F 16/22* (2019.01); *G06F 16/9024* (2019.01)

(58) Field of Classification Search
CPC ...... G06F 16/285; G06F 16/9024; G06F 9/46; G06F 16/22; G06F 9/5044; G06F 9/5027; G06F 9/5088
See application file for complete search history.

(56) References Cited

U.S. PATENT DOCUMENTS

| | | |
|---|---|---|
| 9,501,493 B1 | 11/2016 | Banerjee et al. |
| 10,402,429 B2 | 9/2019 | Eda et al. |
| 2002/0062333 A1 | 5/2002 | Anand et al. |
| 2009/0006526 A1 | 1/2009 | Gingell, Jr. et al. |
| 2009/0293022 A1 | 11/2009 | Fries |
| 2012/0123764 A1 | 5/2012 | Ito et al. |
| 2012/0316846 A1 | 12/2012 | Cohen et al. |
| 2013/0185722 A1 | 7/2013 | Kruglick |
| 2013/0346615 A1 | 12/2013 | Gondi |
| 2014/0068078 A1 | 3/2014 | Hiremane |

(Continued)

OTHER PUBLICATIONS

List of IBM Patents or Patent Applications Treated As Related.
(Continued)

*Primary Examiner* — Jorge A Casanova
(74) *Attorney, Agent, or Firm* — Zilka-Kotab, P.C.

(57) ABSTRACT

A computer-implemented method according to one embodiment includes receiving a computation algorithm to be implemented by one of a plurality of nodes, identifying object classification data for objects stored within the plurality of nodes, identifying capability data for each of the plurality of nodes, determining an optimal node for implementing the computation algorithm from the plurality of nodes, based on the object classification data and the capability data, and returning an identification of the optimal node.

18 Claims, 8 Drawing Sheets

(56) References Cited

U.S. PATENT DOCUMENTS

| | | |
|---|---|---|
| 2014/0282590 A1 | 9/2014 | Cavage et al. |
| 2015/0019598 A1 | 1/2015 | Olderdissen et al. |
| 2015/0235044 A1 | 8/2015 | Cohen et al. |
| 2016/0366068 A1 | 12/2016 | Eda et al. |
| 2017/0017521 A1 | 1/2017 | Gupta et al. |
| 2018/0349465 A1 | 12/2018 | Eda et al. |

OTHER PUBLICATIONS

Openstack, "Under the hood of Swift: the Ring," Feb. 15, 2012, pp. 1-7, Retrieved From https://www.openstack.org/blog/2012/02/1997/.

Openstack, "The Rings," May 22, 2017, pp. 1-7, Retrieved From https://docs.openstack.org/developer/swift/overview_ring.html.

Notice of Allowance from U.S. Appl. No. 15/610,098, dated Apr. 26, 2019.

Eda et al., U.S. Appl. No. 15/610,098, filed May 31, 2017.

MINIMIZING DATA TRANSPORT WITHIN A STORLET ARCHITECTURE

BACKGROUND

The present invention relates to data storage, and more specifically, this invention relates to storing objects and assigning computation algorithms to nodes within an object storage system.

Object storage enables the storage and management of unstructured data in the form of objects. A storlet architecture is a popular means of implementing object storage, where each node within the storlet architecture acts as a compute node (utilizing a virtualization unit) to implement computation operations (utilizing computation algorithms). However, current methods for determining a particular compute node to implement a computation algorithm are inefficient and do not consider factors such as data transport within the storlet architecture caused by implementation of the computation algorithm.

SUMMARY

A computer-implemented method according to one embodiment includes receiving a computation algorithm to be implemented by one of a plurality of nodes, identifying object classification data for objects stored within the plurality of nodes, identifying capability data for each of the plurality of nodes, determining an optimal node for implementing the computation algorithm from the plurality of nodes, based on the object classification data and the capability data, and returning an identification of the optimal node.

According to another embodiment, a computer program product for minimizing data transport within a storlet architecture comprises a computer readable storage medium having program instructions embodied therewith, wherein the computer readable storage medium is not a transitory signal per se, and where the program instructions are executable by a processor to cause the processor to perform a method comprising receiving a computation algorithm to be implemented by one of a plurality of nodes, utilizing the processor, identifying object classification data for objects stored within the plurality of nodes, utilizing the processor, identifying capability data for each of the plurality of nodes, utilizing the processor, determining, utilizing the processor, an optimal node for implementing the computation algorithm from the plurality of nodes, based on the object classification data and the capability data, and returning an identification of the optimal node, utilizing the processor.

A system according to another embodiment includes a processor, and logic integrated with the processor, executable by the processor, or integrated with and executable by the processor, where the logic is configured to receive a computation algorithm to be implemented by one of a plurality of nodes, identify object classification data for objects stored within the plurality of nodes, identify capability data for each of the plurality of nodes, determine an optimal node for implementing the computation algorithm from the plurality of nodes, based on the object classification data and the capability data, and return an identification of the optimal node.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for minimizing data transport within a storlet architecture. Various embodiments provide a method to determine an optimal node for implementing a received computation algorithm utilizing object classification data as well as node capability data.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for minimizing data transport within a storlet architecture.

In one general embodiment, a computer-implemented method includes receiving a computation algorithm to be implemented by one of a plurality of nodes, identifying object classification data for objects stored within the plurality of nodes, identifying capability data for each of the plurality of nodes, determining an optimal node for implementing the computation algorithm from the plurality of nodes, based on the object classification data and the capability data, and returning an identification of the optimal node.

In another general embodiment, a computer program product for minimizing data transport within a storlet architecture comprises a computer readable storage medium having program instructions embodied therewith, wherein the computer readable storage medium is not a transitory signal per se, and where the program instructions are executable by a processor to cause the processor to perform a method comprising receiving a computation algorithm to be implemented by one of a plurality of nodes, utilizing the processor, identifying object classification data for objects stored within the plurality of nodes, utilizing the processor, identifying capability data for each of the plurality of nodes, utilizing the processor, determining, utilizing the processor, an optimal node for implementing the computation algorithm from the plurality of nodes, based on the object classification data and the capability data, and returning an identification of the optimal node, utilizing the processor.

In another general embodiment, a system includes a processor, and logic integrated with the processor, executable by the processor, or integrated with and executable by the processor, where the logic is configured to receive a computation algorithm to be implemented by one of a plurality of nodes, identify object classification data for objects stored within the plurality of nodes, identify capability data for each of the plurality of nodes, determine an optimal node for implementing the computation algorithm from the plurality of nodes, based on the object classification data and the capability data, and return an identification of the optimal node.

Figure 1:
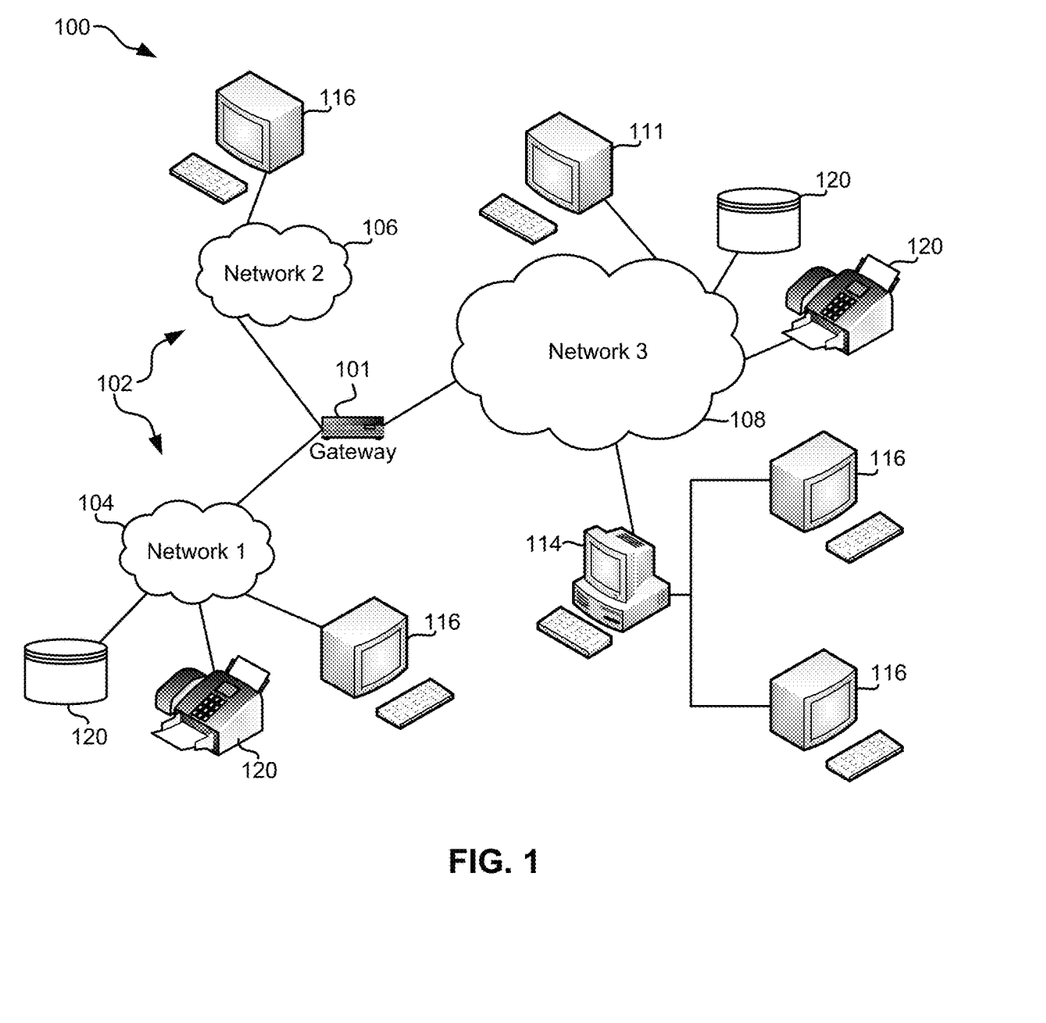
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
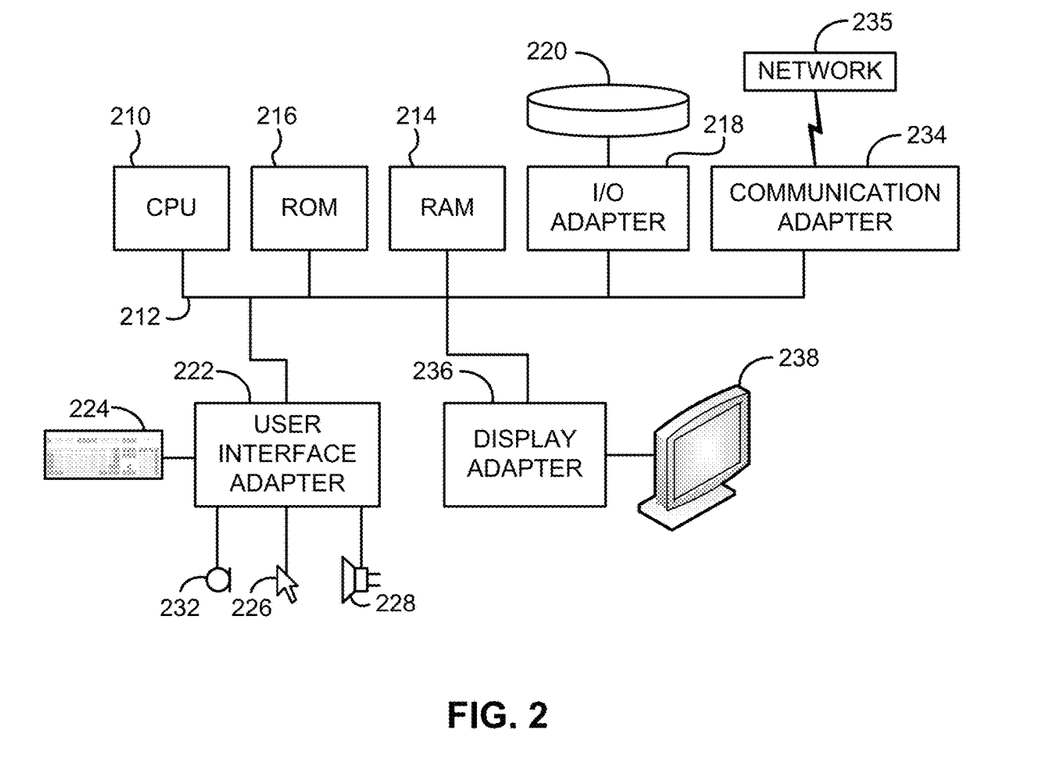
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
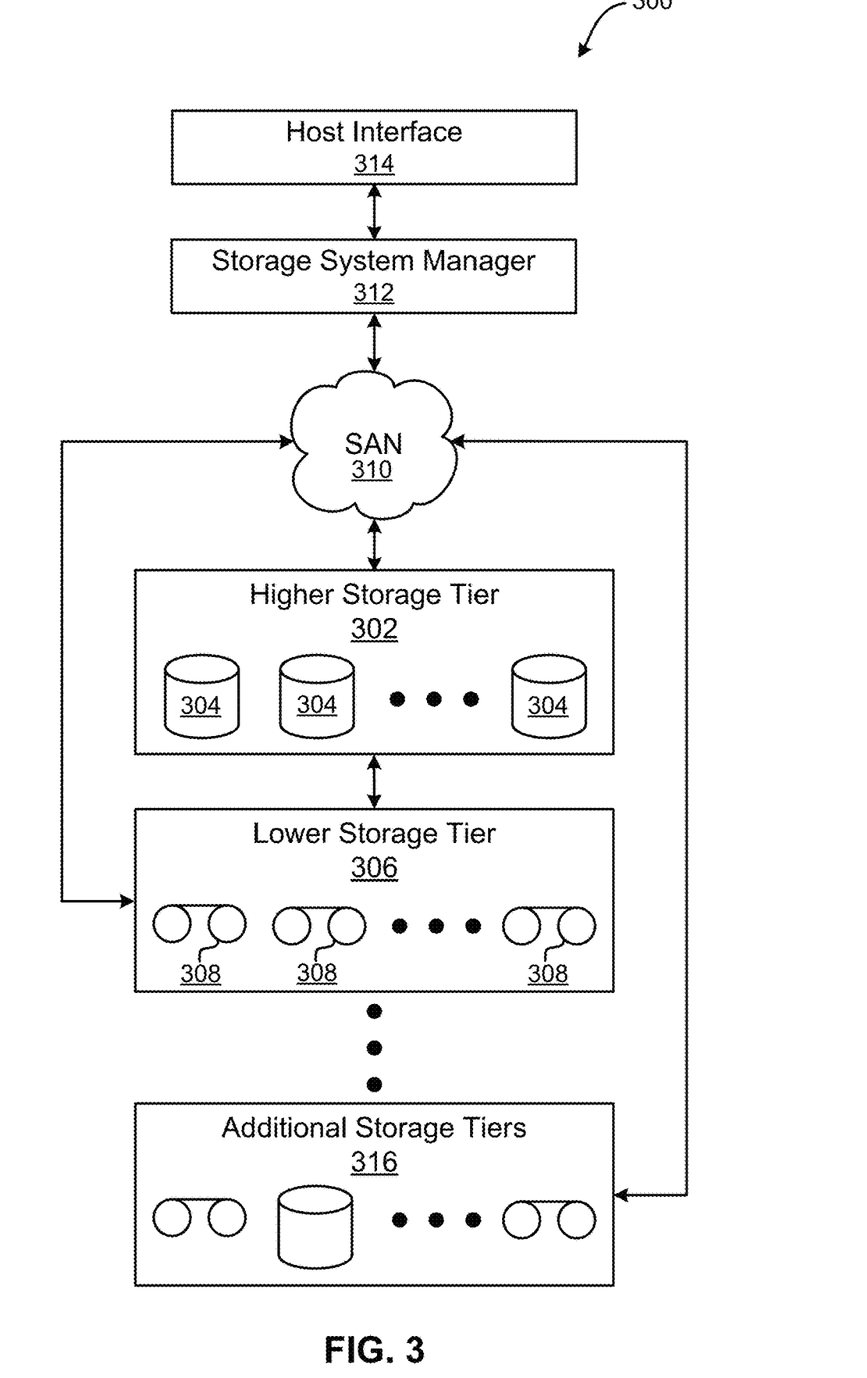
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
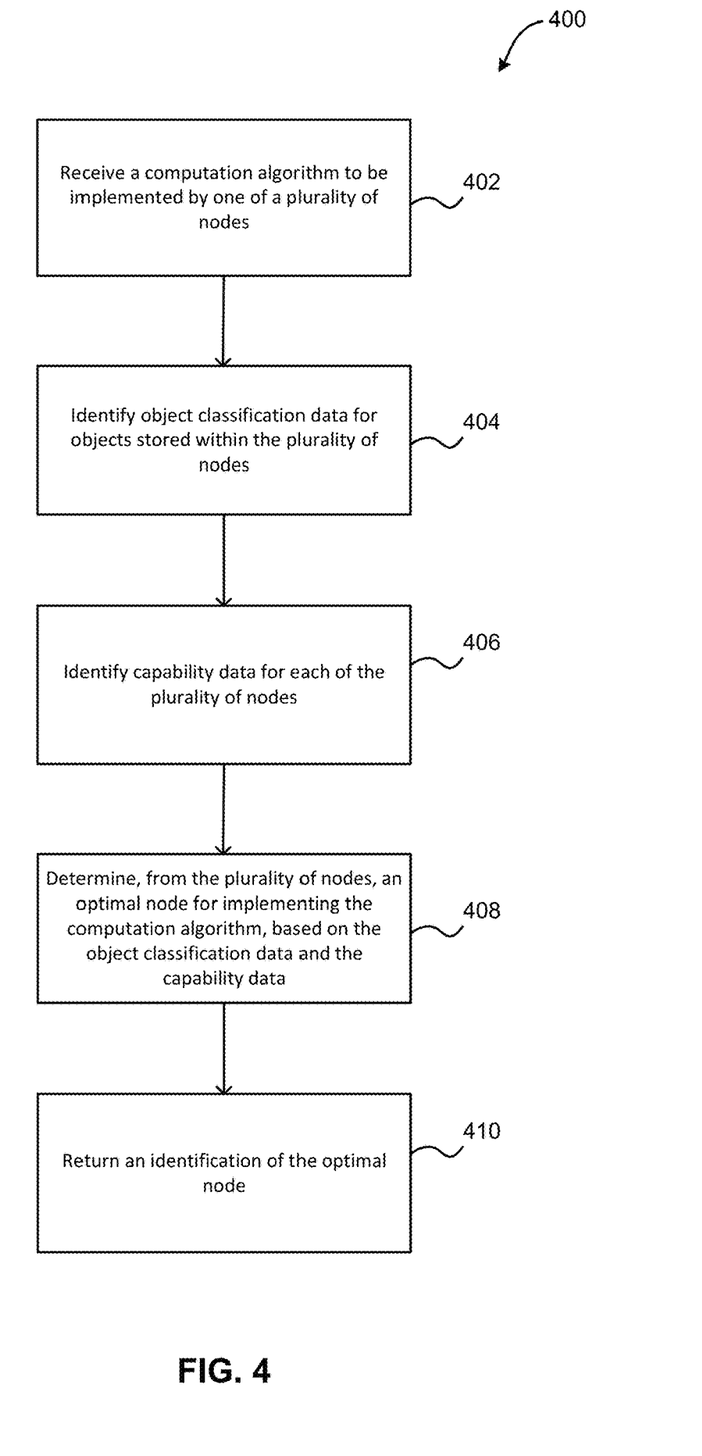
FIG. 4 illustrates a method for minimizing data transport within a storlet architecture, in accordance with one embodiment.

Now referring to FIG. 4, a flowchart of a method 400 is shown according to one embodiment. The method 400 may be performed in accordance with the present invention in any of the environments depicted in FIGS. 1-3, 7, and 8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a computation algorithm to be implemented by one of a plurality of nodes is received. In one embodiment, the computation algorithm may include one or more computation tasks to be performed by one of the plurality of nodes. For example, the one or more computation tasks may include one or more of collecting data, performing analytic operations, performing query operations, etc.

Additionally, in one embodiment, the plurality of nodes may include nodes within an object storage architecture. For example, the nodes may include one or more proxy nodes that are used for distributed load handling and request handling. In another example, the nodes may include one or more storage nodes that write to disk/storage subsystems.

Further, in one embodiment, the plurality of nodes may be included within a storlet architecture. For example, the storlet architecture may include a compute engine embedded object storage. In another example, each node within the storlet architecture may have an associated virtualization unit (e.g., a virtual machine, etc.). For instance, the virtualization units may include Linux® containers, a Docker® software container, a ZeroVM® process virtualization, etc.

Further still, in one embodiment, when a computation algorithm is assigned to one of the plurality of nodes, the associated virtualization unit of the node may implement the computation algorithm (e.g., by performing the one or more computation tasks indicated within the computation algorithm, etc.). In another embodiment, the computation algorithm may be deployed by an end user. For example, the computation algorithm may be deployed using a GUI, etc. In another example, the computation algorithm may be deployed utilizing a normal object PUT operation.

Also, in one embodiment, the computation algorithm may be received utilizing hooking. For example, a hook may be placed in a storlet engine execution cycle. In another example, the hook may intercept the computation algorithm as it is received within the storlet architecture.

In addition, as shown in FIG. 4, method 400 may proceed with operation 404, where object classification data for objects stored within the plurality of nodes is identified. In one embodiment, the object classification data may describe objects that have been stored within the plurality of nodes. For example, as objects are received at the storlet architecture, they may be classified according to one or more criteria. In another example, the one or more criteria may include a content of the object, metadata associated with the object, an owner of the object, an account associated with the object, etc.

Furthermore, in one embodiment, the classification may be done using a template. In another embodiment, the classification may be learning-based (e.g., based on past classifications for similar objects), etc. In yet another embodiment, the object classification data for each object may include a size of the data within the object. For example, the size may be determined by analyzing the object, metadata associated with the object, etc. In another example, the size may be approximated (e.g., rounded up, down, to the nearest MB, etc.).

Further still, in one embodiment, the object classification data may include a computation algorithm identifier. For example, the computation algorithm identifier may identify one of a plurality of different computation algorithms. In another example, the computation algorithm identifier may identify a computation algorithm determined to utilize the object.

Also, in one embodiment, the object classification data may be stored in a data structure. In one embodiment, the data structure may indicate a total size of objects stored within the plurality of nodes that are associated with the computation algorithm (e.g., most likely to be utilized by the computation algorithm). In another embodiment, the data structure may indicate a total count of objects stored in all of the plurality of nodes that are associated with the computation algorithm (e.g., most likely to be utilized by the computation algorithm). In yet another embodiment, the data structure may indicate, for each of the plurality of nodes, a total count of objects stored within the node that are associated with the computation algorithm (e.g., most likely to be used by the computation algorithm during implementation of the computation algorithm).

Additionally, as shown in FIG. 4, method 400 may proceed with operation 406, where capability data for each of the plurality of nodes is identified. In one embodiment, the capability data may include a hardware architecture implemented within each of the plurality of nodes (e.g., architectures like x86, ppc64, etc.). In another embodiment, the capability data may include a network bandwidth available to each of the plurality of nodes (e.g., 1 gigabit ethernet (GbE), 10 GbE, 20 GbE, etc.).

Further, in one embodiment, the capability data may be obtained utilizing one or more daemons. For example, a daemon may be located within each of the plurality of nodes, and may collect and export the capability data for that node. In another embodiment, the capability data may be stored in a template in middleware (e.g., at a storlet scheduler, etc.).

Further still, as shown in FIG. 4, method 400 may proceed with operation 408, where an optimal node for implementing the computation algorithm is determined from the plurality of nodes, based on the object classification data and the capability data. In one embodiment, the optimal node may be determined by comparing the computation algorithm to the object classification data and capability data. In another embodiment, the computation algorithm may be compared to the object classification data in a data structure in order to determine all nodes containing objects associated with the computation algorithm (e.g., objects that are determined as most likely to be used by the computation algorithm during the implementation of the computation algorithm), as well as a size of those objects.

For example, nodes containing a larger number of objects associated with the computation algorithm may be weighted higher than nodes containing a smaller number of objects associated with the computation algorithm. In another example, nodes containing objects associated with the computation algorithm having a greater size may be weighted higher than nodes containing objects associated with the computation algorithm having a smaller size. This may help determine a node that minimizes data transfer between other nodes that is performed during execution of the computation algorithm.

Also, in one embodiment, nodes that contain capability data more favorable to object transfer (e.g., available ethernet bandwidth greater than a predetermined threshold, etc.) may be weighted higher than nodes that contain capability data less favorable to object transfer (e.g., available ethernet bandwidth less than a predetermined threshold, etc.). This may help determine a node that minimizes an execution time of the computation algorithm.

In addition, in one embodiment, a weight assigned to a node may correspond to the capability data for that node. For example, nodes with a higher available ethernet bandwidth may be given a higher weight than nodes with a lower available ethernet bandwidth. In another embodiment, the optimal node may be determined by comparing required input/output (I/O) operations and data size for implementing the computation algorithm by each of the plurality of nodes.

For example, nodes that have fewer necessary I/O operations to implement the computation algorithm may be weighted higher than nodes that have a greater necessary I/O operations to implement the computation algorithm. In another example, nodes that have a lesser amount of necessary I/O data to implement the computation algorithm may be weighted higher than nodes that have a greater amount of necessary I/O data to implement the computation algorithm.

Furthermore, in one embodiment, the optimal node may be determined by comparing an identified zone (e.g., a subnet, etc.) in which each of the plurality of nodes is located to a zone in which a request processing node is located. In another embodiment, each of the nodes may be weighted according to a proximity of the node's zone (e.g., a zone in which the node is located) to the request processing node's zone (e.g., a zone in which the request processing node is located).

For example, nodes that have a closer physical proximity to the request processing node may be given a higher weight than nodes that have a further physical proximity to the request processing node. This may help determine a node that minimizes input/output (110) data transfer between the node and an end user, and minimizes a delay in execution completion.

Further still, in one embodiment, weighting may be utilized in determining the optimal node. For example, one or more weights may be assigned to each node, and node with the highest combination of weights may be selected as the optimal node.

Also, as shown in FIG. 4, method 400 may proceed with operation 410, where an identification of the optimal node is returned. In one embodiment, the identification may be passed from the storlet scheduler to a storlet engine. In another embodiment, the storlet engine may assign the computation algorithm to the optimal node, in response to receiving the identification.

Figure 5:
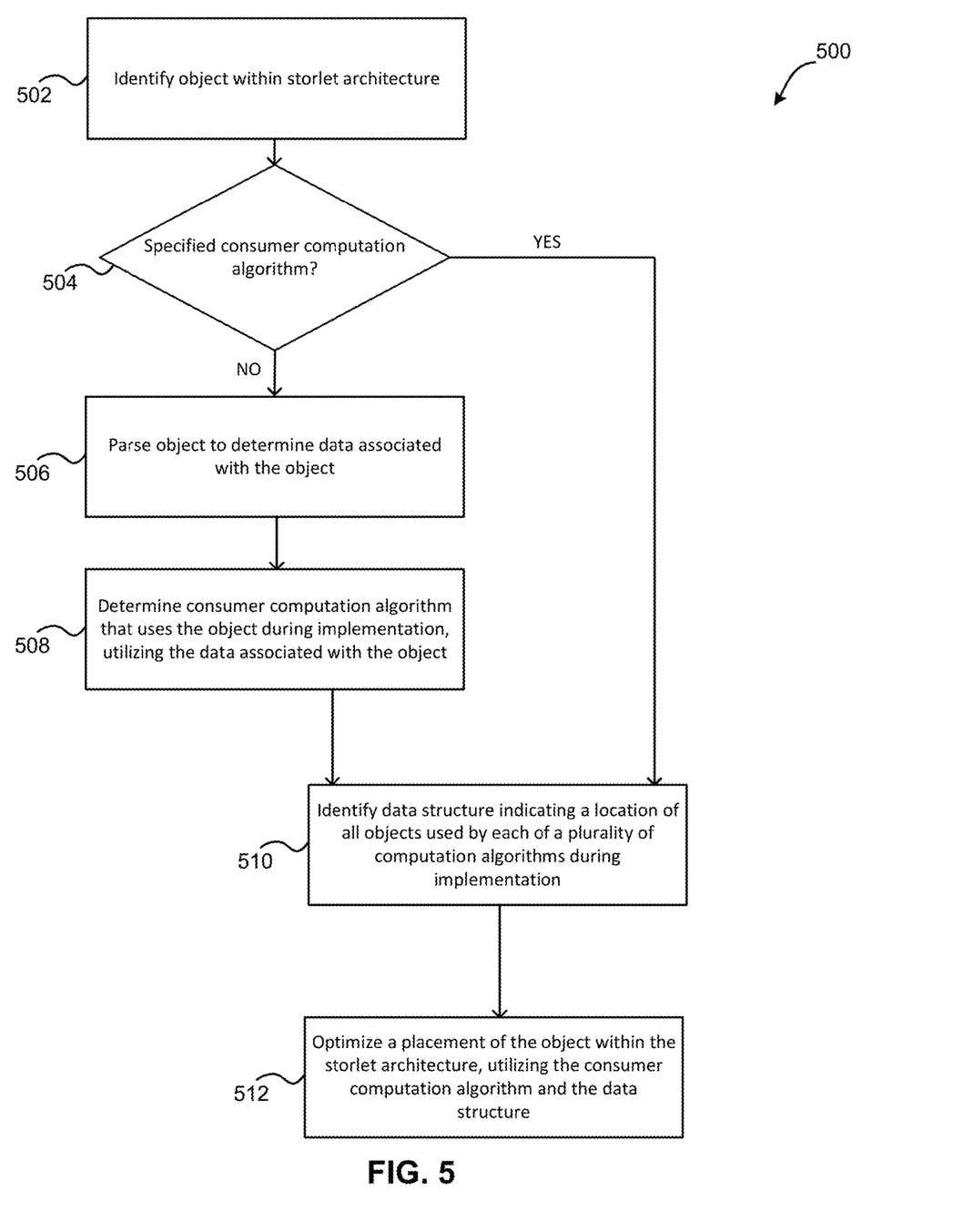
FIG. 5 illustrates a method for analyzing and placing objects within a storlet architecture, in accordance with one embodiment.

Now referring to FIG. 5, a flowchart of a method 500 for analyzing and placing objects within a storlet architecture is shown according to one embodiment. The method 500 may be performed in accordance with the present invention in any of the environments depicted in FIGS. 1-3, 7, and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an object is identified within a storlet architecture. In one embodiment, the object may be identified in response to the receipt of the object at the storlet architecture. In another embodiment, the object may be identified in response to a request to place, replicate, or migrate the object. In yet another embodiment, the object may be identified in response to hooking the storlet execution cycle.

Additionally, as shown in FIG. 5, method 500 may proceed with decision 504, where it is determined whether a user has specified a consumer computation algorithm to use the object. For example, the user may specify the computation algorithm in a request to place, replicate, or migrate the object.

If it is determined in decision 504 that the user has not specified a consumer computation algorithm to use the object, then as shown in FIG. 5, method 500 may proceed with operation 506, where the object is parsed to determine data associated with the object. In one embodiment, the data may include a content of the object, metadata associated with the object (e.g., an owner of object, an account associated with object, etc.), etc.

Additionally, as shown in FIG. 5, method 500 may proceed with operation 508, where a consumer computation algorithm is determined that uses the object during implementation, utilizing the data associated with the object. In one embodiment, the consumer computation algorithm may be selected from a list of known computation algorithms within the storlet architecture. In another embodiment, the consumer computation algorithm may be determined by analyzing known computation algorithms and details of objects that are used by each computation algorithm. For example, when the data associated with the object matches all or a predetermined number of details of objects used by a computation algorithm, it may be determined that the computation algorithm uses the object when it is implemented within the storlet architecture.

Further, as shown in FIG. 5, method 500 may proceed with operation 510, where a data structure indicating a location of all objects used by each of a plurality of computation algorithms during implementation is identified. In one embodiment, the data structure may indicate a number of objects that are used by each computation algorithm. In another embodiment, the data structure may indicate, for each computation algorithm, a number of objects associated with that computation algorithm that are stored on each node within the storlet architecture.

Further still, as shown in FIG. 5, method 500 may proceed with operation 512, where a placement of the object is optimized within the storlet architecture, utilizing the consumer computation algorithm and the data structure. In one embodiment, the object may be placed in a node having the largest number of objects used by the consumer computation algorithm, according to the data structure. In another embodiment, optimizing the placement of the object may include influencing an object placement algorithm within the storlet architecture.

Also, in one embodiment, the placement may be optimized upon determining that an object count is greater than a threshold. For example, the object count may include a number of objects stored within the storlet architecture. In another example, the object count may include a number of objects associated with the consumer computation algorithm. In yet another example, the placement may be performed based on an available storage space of each node if the object count is less than the threshold.

In addition, if it is determined in decision 504 that the user has specified a consumer computation algorithm to use the object, then as shown in FIG. 5, method 500 may proceed with operation 510, where a data structure indicating a location of all objects used by each of a plurality of computation algorithms is identified, and as shown in FIG. 5, method 500 may proceed with operation 512, where a placement of the object is optimized within the storlet architecture, utilizing the consumer computation algorithm and the data structure. In one embodiment, the data structure may also be updated to reflect the placement of the object within the storlet architecture.

Table 1 illustrates exemplary object classification data structure, in accordance with one embodiment. Of course, it should be noted that the exemplary object classification data structure shown in Table 1 is set forth for illustrative purposes only, and thus should not be construed as limiting in any manner.

TABLE 1

Object-1 -> {algorithm: algorithm-1; Size: 10 MB; count: 2; storage_node1: 1, storage_node2: 1}
Object-2 -> {algorithm: algorithm-1; algorithm-2; Size: 20 MB; count: 3; storage_node1: 2, storage_node2: 1}
Object-3 -> {algorithm: algorithm-2; Size: 15 MB; count: 2; storage_node1: 1, storage_node2: 1}
Object-4 -> {algorithm: algorithm-3; Size: 1 GB; count: 5; storage_node1: 2, storage_node2: 3}
Object-5 -> {algorithm: algorithm-4; Size: 50 MB; count: 1; storage_node1: 0, storage_node2: 1}

As shown in Table 1, an identifier of each object is stored in association with a consumer computation algorithm that uses that object, a size of the data associated with that object, a total number of instances of the object within the storlet architecture, and a total number of instances of the object stored on each node within the storlet architecture.

In one example, when "algorithm-3" is deployed to the storlet architecture, the data structure in Table 1 may be referenced. It may be determined from the data structure that for "algorithm-3," storage node 1 contains two used objects, while storage node 2 contains three used objects. As a result, since storage node 2 contains the greatest number of used objects for "algorithm 3," storage node 2 may be selected for implementation of "algorithm-3," or storage node 2 may be given a greater weight than other storage nodes within a node determination algorithm.

In another example, when an additional object is received at the storlet architecture, the data structure in Table 1 may be referenced. The additional object may be parsed and compared to other objects within the object classification data structure. Based on the comparison, it may be determined that the additional object has a predetermined amount of data in common with "Object-4" within the data structure. It may be determined from the data structure that "Object-4" is used by "algorithm-3," and that two instances of the object are stored on storage node 1, while three instances of the object are stored in storage node 2.

Since storage node 2 contains the greatest number of stored instances of "Object-4," and the additional object is determined to have a predetermined amount of data in common with "Object-4," the additional object may be stored in storage node 2 within the storlet architecture, or storage node 2 may be given a greater weight than other storage nodes within an object placement algorithm. The data structure may also be updated to reflect the storage of the additional object (e.g., by increasing the count of storage node 2 from three to four).

In this way, a hook in the storlet engine execution cycle may facilitate a provision to auto classify incoming objects, (where the classification may be dependent on past statistics or user programmed templates, content, metadata, owner, account etc.) and determine its consumer among a given set of computation algorithms. This classification may then be used to influence computation algorithm placement and object storage such that data transport (e.g., input to a computation algorithm, output from a computation algorithm) between the nodes as well as I/O streams from nodes to end users are minimized.

Figure 6:
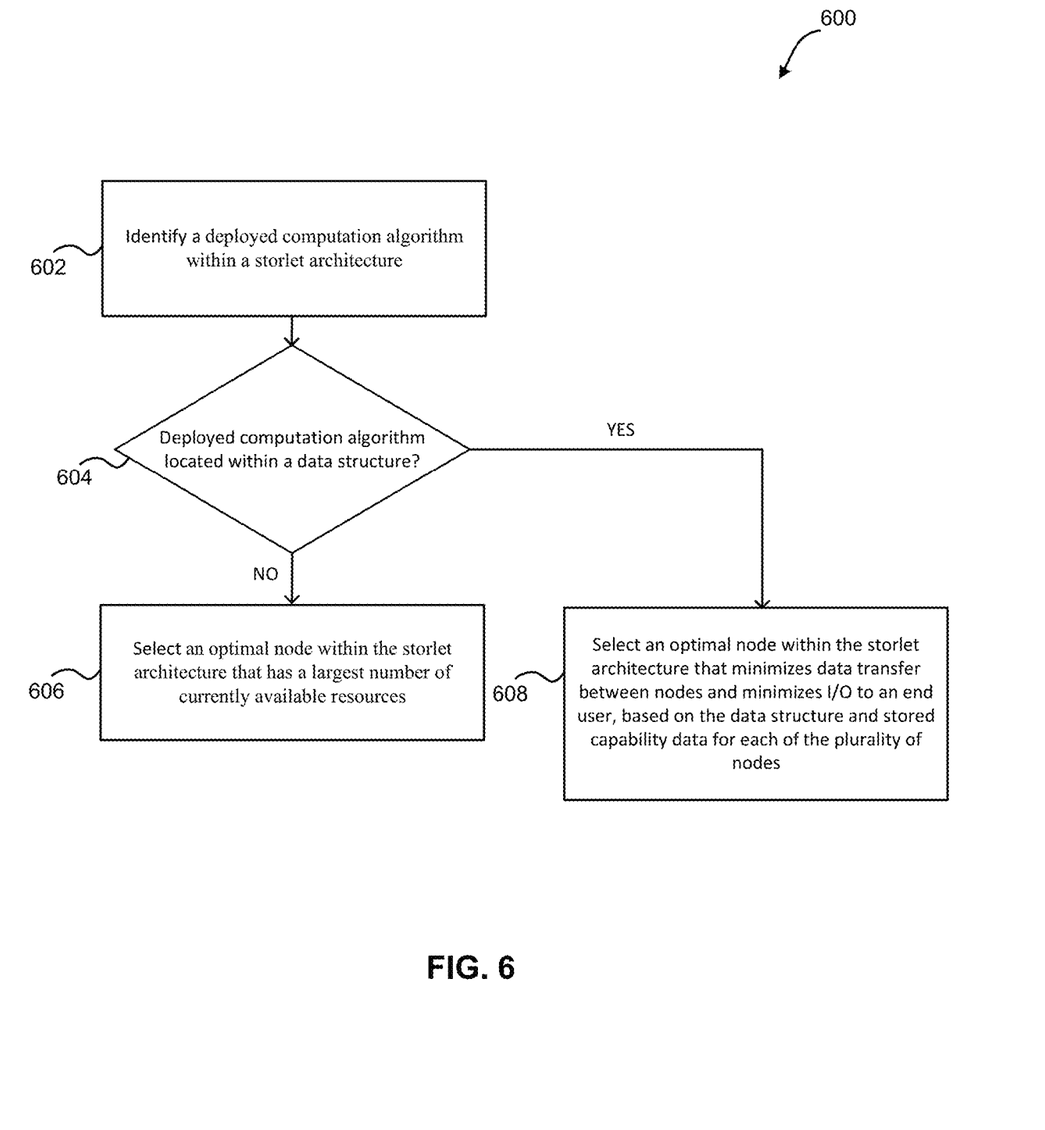
FIG. 6 illustrates a method for selecting a node to implement a deployed computation algorithm, in accordance with one embodiment.

Now referring to FIG. 6, a flowchart of a method 600 for selecting a node to implement a deployed computation algorithm is shown according to one embodiment. The method 600 may be performed in accordance with the present invention in any of the environments depicted in FIGS. 1-3, 7, and 8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a deployed computation algorithm is identified within a storlet architecture. In one embodiment, the computation algorithm may be deployed into a storlet architecture to be implemented by a node of the storlet architecture.

Additionally, as shown in FIG. 6, method 600 may proceed with decision 604, where it is determined whether the deployed computation algorithm is located within a data structure indicating a location of all objects associated with each of a plurality of computation algorithms. In one embodiment, the data structure may indicate a number of objects that are associated with each computation algorithm. In another embodiment, the data structure may indicate, for each computation algorithm, a number of objects associated with that computation algorithm that are stored on each node within the storlet architecture.

Further, if it is determined in decision 604 that the deployed computation algorithm is not located within a data structure indicating a location of all objects associated with each of a plurality of computation algorithms, then as shown in FIG. 6, method 600 may proceed with operation 606, where an optimal node is selected within the storlet architecture that has a largest number of currently available resources. In one embodiment, the available resources may include one or more of bandwidth, storage, processing, etc.

Further still, if it is determined in decision 604 that the deployed computation algorithm is located within a data structure indicating a location of all objects associated with each of a plurality of computation algorithms, then as shown in FIG. 6, method 600 may proceed with operation 608, where an optimal node is selected within the storlet architecture that minimizes data transfer between nodes and minimizes I/O to an end user, based on the data structure and stored capability data for each of the plurality of nodes.

Figure 7:
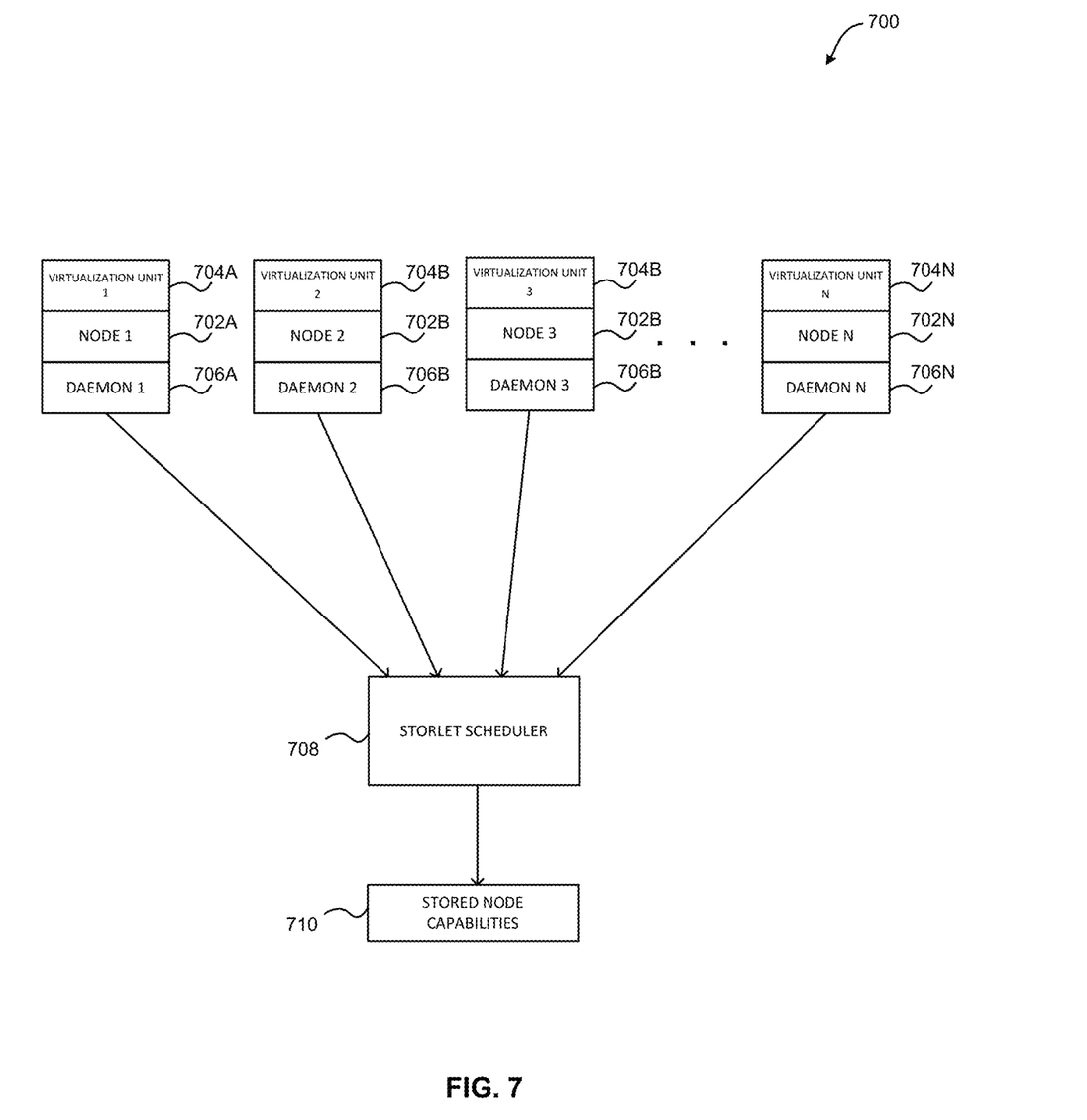
FIG. 7 illustrates an exemplary framework for collecting and exporting node capability data, in accordance with one embodiment.

FIG. 7 illustrates an exemplary framework 700 for collecting and exporting node capability data, according to one embodiment. As shown, an object storage cluster includes a plurality of object storage nodes 702A-N. In one embodiment, each of the plurality of object storage nodes 702A-N may include one of two entities/node groups. For example, one or more of the plurality of object storage nodes 702A-N may include a proxy node which may be used for distributed load handling/request handling into the namespace. In another example, one or more of the plurality of object storage nodes 702A-N may include a storage node that is responsible for writing into disks/storage subsystems.

Additionally, each of the plurality of object storage nodes 702A-N includes its own virtualization unit 704A-N. In one embodiment, the virtualization units 704A-N may each include a software engine present within the object storage nodes 702A-N that performs computation tasks. In one embodiment, an end user may frame a computation algorithm, which may be deployed or passed to one of the virtualization units 704A-N as a normal object PUT operation. In another embodiment, the virtualization units 704A-N may not require any additional client or compute node to perform analysis of the data. For example, the object storage nodes 702A-N may act as compute nodes and may return results back to the user.

Further, each of the plurality of object storage nodes 702A-N includes its own daemon 706A-N. In one embodiment, for each of the plurality of object storage nodes 702A-N, the daemon 706A-N located on that node may collect node capability data for the respective object storage nodes 702A-N. For instance, the daemon 706A may collect node capability data for the object storage node 702A, the daemon 706B may collect node capability data for the object storage node 702A, etc.

Further still, in one embodiment, the node capability data may include hardware architecture for the node and network capabilities of the node (e.g., available network bandwidth for the node, etc.). Table 2 illustrates exemplary node capability data for each of a plurality of nodes, in accordance with one embodiment. Of course, it should be noted that the exemplary node capability data shown in Table 2 is set forth for illustrative purposes only, and thus should not be construed as limiting in any manner.

TABLE 2

| |
|---|
| node1@capabilties = {architecture: x86, network: 1G} |
| node2@capabilties = {architecture: ppc64, network: 10G} |
| node3@capabilties = {architecture: x86, network: 20G} |

Also, each of the daemons 706A-N are in communication with a storlet scheduler 708. In one embodiment, each of the daemons 706A-N may report their collected node capability data to the storlet scheduler 708. In another embodiment, the storlet scheduler 708 may store the received virtualization unit metadata in data storage 710. In this way, the stored node capability data may be used to assist in object placement, as well as assigning a computation algorithm to a node.

Figure 8:
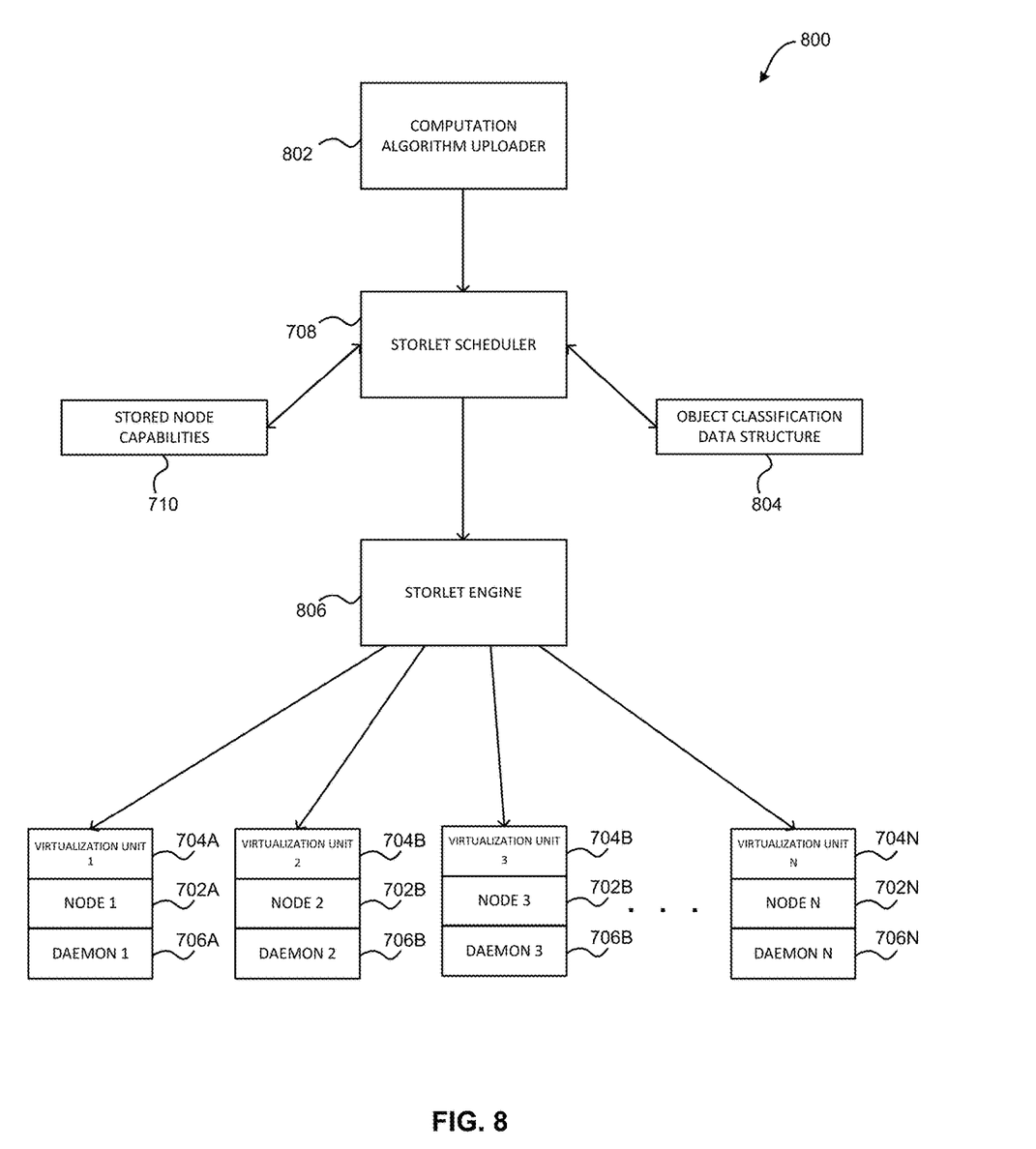
FIG. 8 illustrates an exemplary storlet workflow optimization framework, in accordance with one embodiment.

FIG. 8 illustrates an exemplary storlet workflow optimization framework 800, according to one embodiment. As shown, a computation algorithm uploader 802 is in communication with a storlet scheduler 708. In one embodiment, the computation algorithm uploader 802 may enable a user to upload a computation algorithm for execution by a virtualization unit 704A-N of an object storage node 702A-N within an object storage cluster. For example, the computation algorithm uploader 802 may include an object storage interface that requests a user ID and password. In another example, the computation algorithm uploader 802 may include a computation algorithm upload interface that enables the uploading of a computation algorithm.

Additionally, the storlet scheduler 708 may obtain the computation algorithm uploaded by the computation algorithm uploader 802. In one embodiment, the storlet scheduler 708 may utilize a hook to intercept the computation algorithm as it is received via the computation algorithm uploader 802.

In another embodiment, the storlet scheduler 708 may retrieve from an object classification data structure 804 object classification data for objects stored within the plurality of object storage nodes 702A-N. The storlet scheduler 708 may also retrieve from data storage 710 collected node capability data for the plurality of object storage nodes 702A-N. The storlet scheduler 708 may then select one of the object storage nodes 702A-N, utilizing a node selection algorithm that considers the computation algorithm, the object classification data, and the node capability data, as well as one or more zones in which the object storage nodes 702A-N are located within the object storage cluster.

Further, in one embodiment, the storlet scheduler 708 may help the storlet engine 806 to determine the appropriate virtualization unit 704A-N and object storage node 702A-N to be selected for processing the deployed computation algorithm, in order to minimize data transfer between nodes, I/O to an end user, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a computation algorithm to be implemented by one of a plurality of nodes;
   identifying object classification data for objects stored within the plurality of nodes;
   identifying capability data for each of the plurality of nodes;
   determining an optimal node for implementing the computation algorithm from the plurality of nodes, based on the object classification data and the capability data, where weighting is utilized in determining the optimal node, and:
   nodes containing a larger number of objects associated with the computation algorithm are weighted higher than nodes containing a smaller number of objects associated with the computation algorithm, and/or
   nodes containing objects associated with the computation algorithm having a greater size are weighted higher than nodes containing objects associated with the computation algorithm having a smaller size; and
   returning an identification of the optimal node.

2. The computer-implemented method of claim 1, wherein the plurality of nodes is included within a storlet architecture.

3. The computer-implemented method of claim 1, wherein the computation algorithm is received utilizing hooking.

4. The computer-implemented method of claim 1, wherein the object classification data describes objects that have been stored within the plurality of nodes.

5. The computer-implemented method of claim 1, wherein the object classification data for each of the objects includes a size of data within the object.

6. The computer-implemented method of claim 1, wherein the object classification data for each of the objects includes a computation algorithm identifier that identifies one of a plurality of different computation algorithms determined to utilize the object.

7. The computer-implemented method of claim 1, wherein the object classification data is stored in a data structure, where the data structure indicates:
   a total size of the objects stored within the plurality of nodes that are associated with the computation algorithm,
   a total count of the objects stored within all of the plurality of nodes that are associated with the computation algorithm, and
   for each of the plurality of nodes, a total count of objects stored within the node that are associated with the computation algorithm.

8. The computer-implemented method of claim 1, wherein the capability data includes a hardware architecture implemented within each of the plurality of nodes.

9. The computer-implemented method of claim 1, wherein the capability data includes a network bandwidth available to each of the plurality of nodes.

10. The computer-implemented method of claim 1, wherein weighting is utilized in determining the optimal node, where nodes that contain capability data more favorable to object transfer are weighted higher than nodes that contain capability data less favorable to object transfer.

11. A computer program product for minimizing data transport within a storlet architecture, the computer program product comprising a computer readable storage medium having program instructions embodied therewith, wherein the computer readable storage medium is not a transitory signal per se, the program instructions executable by a processor to cause the processor to perform a method comprising:
   receiving a computation algorithm to be implemented by one of a plurality of nodes, utilizing the processor;
   identifying object classification data for objects stored within the plurality of nodes, utilizing the processor;
   identifying capability data for each of the plurality of nodes, utilizing the processor;
   determining, utilizing the processor, an optimal node for implementing the computation algorithm from the plurality of nodes, based on the object classification data and the capability data, where weighting is utilized in determining the optimal node, and:
      nodes containing a larger number of objects associated with the computation algorithm are weighted higher than nodes containing a smaller number of objects associated with the computation algorithm, and/or
      nodes containing objects associated with the computation algorithm having a greater size are weighted higher than nodes containing objects associated with the computation algorithm having a smaller size; and
   returning an identification of the optimal node, utilizing the processor.

12. The computer program product of claim 11, wherein the plurality of nodes is included within a storlet architecture.

13. The computer program product of claim 11, wherein the computation algorithm is received utilizing hooking.

14. The computer program product of claim 11, wherein the object classification data describes objects that have been stored within the plurality of nodes.

15. The computer program product of claim 11, wherein the object classification data for each of the objects includes a size of data within the object.

16. The computer program product of claim 11, wherein the object classification data for each of the objects includes a computation algorithm identifier that identifies one of a plurality of different computation algorithms determined to utilize the object.

17. The computer program product of claim 11, wherein the object classification data is stored in a data structure, where the data structure indicates:
   a total size of the objects stored within the plurality of nodes that are associated with the computation algorithm,
   a total count of the objects stored within all of the plurality of nodes that are associated with the computation algorithm, and
   for each of the plurality of nodes, a total count of objects stored within the node that are associated with the computation algorithm.

18. A system, comprising:
a processor; and
logic integrated with the processor, executable by the processor, or integrated with and executable by the processor, the logic being configured to:
   receive a computation algorithm to be implemented by one of a plurality of nodes;
   identify object classification data for objects stored within the plurality of nodes;
   identify capability data for each of the plurality of nodes;
   determine an optimal node for implementing the computation algorithm from the plurality of nodes, based on the object classification data and the capability data, where weighting is utilized in determining the optimal node, and:
      nodes containing a larger number of objects associated with the computation algorithm are weighted higher than nodes containing a smaller number of objects associated with the computation algorithm, and/or
      nodes containing objects associated with the computation algorithm having a greater size are weighted higher than nodes containing objects associated with the computation algorithm having a smaller size; and
   return an identification of the optimal node.

* * * * *